United States Patent [19]

Porter

[11] 3,988,592
[45] Oct. 26, 1976

[54] ELECTRICAL GENERATING SYSTEM

[76] Inventor: William H. Porter, 355 Westbourne St., La Jolla, Calif. 92037

[22] Filed: Nov. 14, 1974

[21] Appl. No.: 523,579

[52] U.S. Cl. .................................. 290/53; 417/330
[51] Int. Cl.² .................................... F03B 13/12
[58] Field of Search ........ 290/4 A, 4 D, 4 R, 52–55; 417/330, 331, 333; 60/497, 501, 505, 413

[56] References Cited
UNITED STATES PATENTS

| | | | |
|---|---|---|---|
| 2,701,526 | 2/1955 | Rotkin | 290/55 |
| 3,126,830 | 3/1964 | Dilliner | 417/331 |
| 3,231,749 | 1/1966 | Hinck | 290/53 |
| 3,307,827 | 3/1967 | Silvers | 60/501 |
| 3,515,889 | 6/1970 | Kammeror | 290/53 |
| 3,912,938 | 10/1975 | Filipenco | 417/330 |

Primary Examiner—Gerald P. Tolin
Attorney, Agent, or Firm—Richard K. Macneill

[57] ABSTRACT

An electrical generating system in which a hermetically sealed flotation sphere, preferably constructed of plastic, is anchored to a sea bed. The sphere carries a circumferential fender on the outside thereof in which is located a plurality of screws open to sea water which generate electricity from the action of ground swells. A wind turbine is mounted on top of the sphere for generating electricity from wind action and a solar generator is disposed directly beneath the wind turbine and on the upper surface of the sphere for generating energy from solar heat. An air compressor is disposed beneath the sphere for generating electricity from tidal action.

6 Claims, 7 Drawing Figures

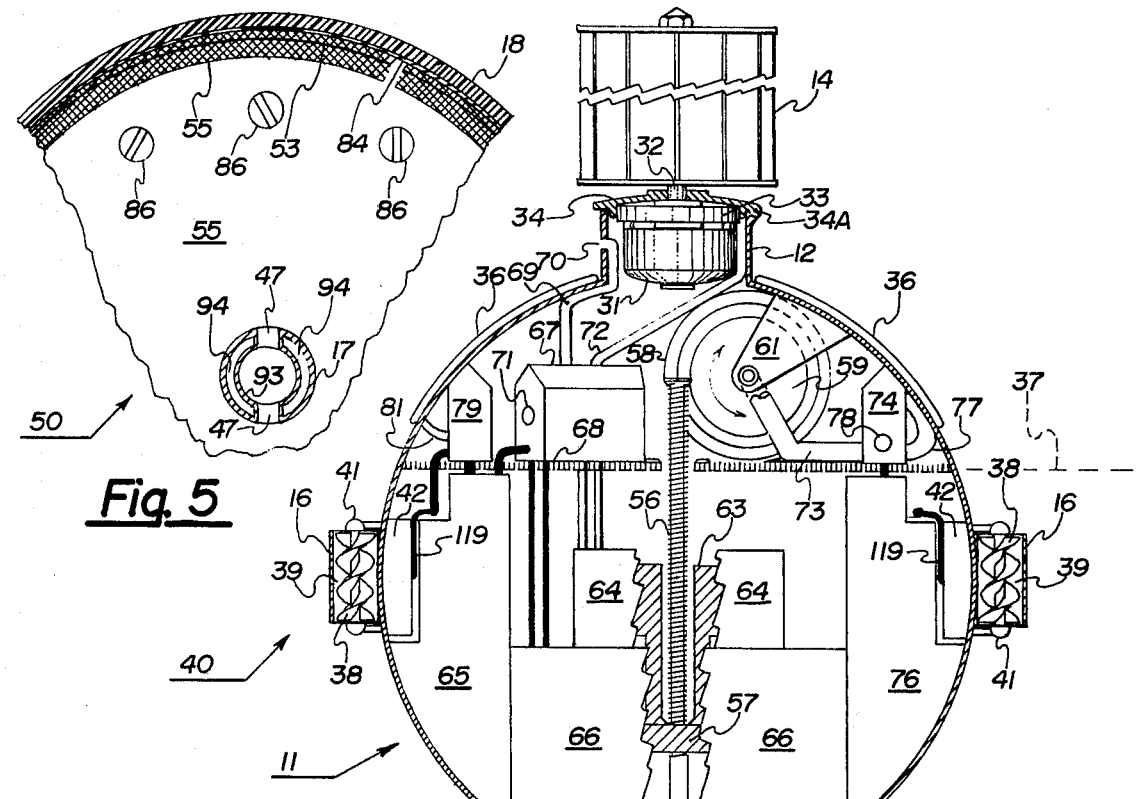
Fig. 5
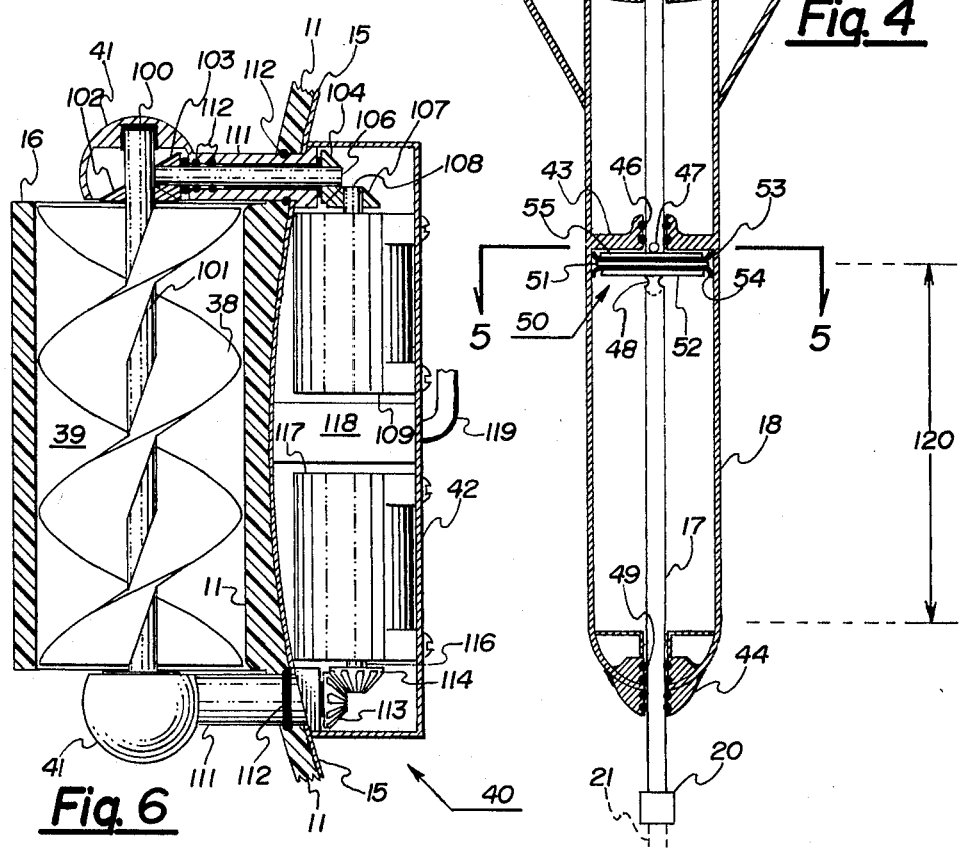
Fig. 4
Fig. 6

3,988,592

ELECTRICAL GENERATING SYSTEM

BRIEF DESCRIPTION OF THE INVENTION

The present invention relates to an electrical generating system which generates electricity from wind action, solar heat, sea tides and sea ground swells.

According to the invention, an electrical generating system is provided in which an hermetically sealed flotation sphere, preferably constructed of plastic, is anchored to a sea bed at an ocean bottom, for example. The sphere's ballast exposes the top portion of the sphere above the surface of the water and carries a wind turbine on the top thereof which is coupled to a suitable generator within the sphere. A fender is disposed circumferentially and horizontally around the outside of the sphere under the water line within which is located a plurality of screws. These screws rotate in response to ground swell action and are coupled to suitable generators and energy storage devices within the sphere itself. The sphere is anchored through a linear air compressor shaft which has a piston on which the sphere moves in response to tidal conditions which, in turn, also drives suitable power generating means within the sphere. A solar generator can be located on the top exposed surface of the sphere for generating electricity in response to solar energy. It is contemplated that a farm of these flotation spheres and their associated generating and storage equipment could be disposed in isolated sections off-shore with all their outputs coupled together for minimum variation in electrical output, i.e., the electricity generated within each sphere could be coupled to a battery bank and in turn coupled in parallel fashion or serial relationship to an output and through suitable transmission means to a shore station.

An object of the present invention is the provision of an improved electrical generating system.

Another object of the present invention is the provision of an electrical generating system taking advantage of a plurality of natural forces and sources of energy.

Yet another object of the invention is the provision of an electrical generating system which is extremely flexible and requires a minimum of maintenance and attention.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein:

FIG. 4 is a partial section and view cut along lines 4 — 4 of FIG. 1;

FIG. 5 is a segmented view taken along lines 5 — 5 of FIG. 4;

FIG. 6 is an enlarged section and view of the swell screw assembly of FIG. 4.

DETAILED DESCRIPTION OF THE INVENTION

Figure 1:
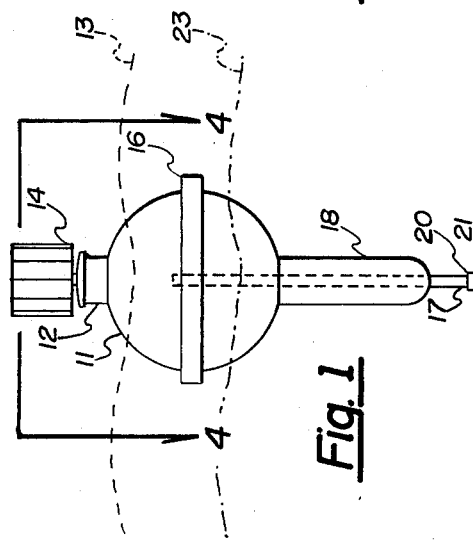
FIG. 1 is a schematic representation of the preferred embodiment of the present invention disposed in shoal water.

Referring to FIG. 1, a flotation sphere is shown in its mid-tide position with a generator housing 12 above high tide water line 13. A wind turbine 14 is mounted on generator housing 12. Fender 16 is circumferentially and horizontally disposed around the outside of flotation sphere 11. Drive pipe 17 is coupled through tubular stem 18 into flotation sphere 11. Drive pipe 17 is also coupled to anchor 19 through universal connecting link 21. Anchor 19 rests on the sea bed 22. A low tide level is indicated in dotted lines at 23.

Figure 2:
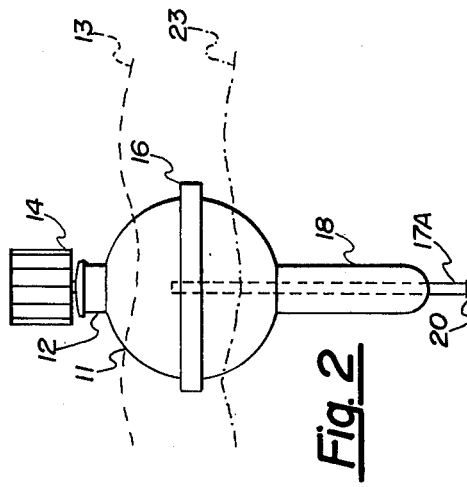
FIG. 2 is a schematic representation of the embodiment of FIG. 1 installed in relatively deep water.

Referring to FIG. 2, flotation sphere 11 again carries a generator housing 12 on a top exposed surface which in turn carries wind turbine 14. Fender 16 surrounds and is carried by flotation sphere 11. The high and low tides are again marked at 13 and 23. Tubular stem 18 is disposed below flotation sphere 11 with drive pipe 17A disposed within and extending into flotation sphere 11. Tubular drive pipe 17A also extends through and is permanently affixed to secondary flotation sphere 11A and tubular stem 18A disposed beneath flotation sphere 11A, and is coupled to tether 23 at coupler 24 which in turn is coupled to anchor 19 at 26. Anchor 19 rests on the sea bed 22.

Figure 3:
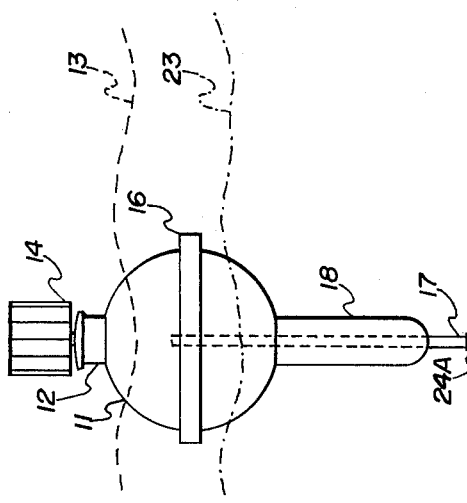
FIG. 3 is a schematic representation of the embodiment of FIG. 1 modified for medium depth water.

Referring to FIG. 3, flotation sphere 11 carries generator housing 12 on which wind turbine 14 is rotatively mounted. Fender 16 is carried by flotation sphere 11 circumferentially in a horizontal position. Drive pipe 17 passes through tubular stem 18 into flotation sphere 11. Drive pipe 17 is also coupled at 24A to tether 23A which in turn is coupled at 26 to anchor 19. Anchor 19 rests on the sea bed 22.

Referring to FIG. 4, flotation sphere 11 is shown with generator housing 12 at the top portion thereof which houses a generator 31 which in turn is coupled through shaft 32 to wind turbine 14. Compressed air turbine 33 is disposed between generator 31 and the top of housing 12. An entry hatch 34 is shown at the top of housing 12 hinged at 34a. A solar energy absorbing surface 36 is carried by the surface of flotation sphere 11 at the top portion thereof and above momentary sea level line 37. Fender 16 carries a multiplicity of swell screws 38 disposed between screw separator panels 39. Swell screws 38 are coupled through drive caps 41 to generator housings 42 located within flotation sphere 11.

Tubular stem 18 is disposed beneath flotation sphere 11 and carries drive pipe 17 at seal support 82 having O-rings 83. Seal support 43 carries O-rings 46. Drive pipe 17 has an internal port 47 and an external port 48. Lower seal housing 44 has a plurality of O-rings 49. A linear piston 50 is a central piston disc 51 which is contiguous with drive pipe 17 and below it is a downturned seal lip 54 held captive by a lower plate 52, and above it an upper seal lip 53 held captive by an upper plate 55. Drive pipe 17 has an upper threaded ball screw 56 which is engaged with ball nut drive 57. Drive pipe 17 terminates at air hose 58 which is wound on dual hose reel 59 rotatably carried by bracket 61. Ball nut drive 57 is coupled through power transfer yolk 63 to air compressor 64 and is also directly coupled to tide generator 66. The output and input of air compressor 64 is connected to an automatic control and test station module 67 which rides on perforated maintenance deck 68. Control module 67 has an air line input 69 coupled to external port 70, an input/output port 71 communicating with the atmosphere within flotation sphere 11, and an output/input air line 72 coupled to compressed air turbine 33 which communicates in turn with the atmosphere outside of flotation sphere 11 through an external port (not shown) similar to port 70.

Air hose 58 is coupled through air manifold 73 to automatic control station 74 which in turn is coupled through line 77 to an external intake port (not shown) such as 70. Automatic control module 74 also has a port 78 coupled to the atmosphere inside of flotation sphere 11. Automatic control module 79 is coupled at line 81 to solar energy absorbing surface 36.

Referring to FIG. 5, tubular stem 18 is contiguous with a steel lining 84. Within the tubular stem travels the linear piston 50, here visible as the upper seal lip 53 held to the central piston disc (not shown) by the top plate 55 and screws 86. Top plate 55 encircles drive pipe 17 which is coaxial, containing an internal chamber 93 which is vented through the internal ports 47 and the external chamber 94, which is vented through the external port 48 (FIG. 4).

Referring to FIG. 6, fender 16 is carried by flotation sphere 11 which has a steel liner 15 therein. Fender 16 surrounds a multiplicity of swell generator assemblies 40, one of which is depicted with screws 38 on shaft 101 rotatively supported between drive caps 41 in an open-ended chamber formed by fender 16, sphere 11, and two adjacent screw separator panels 39. Each drive cap 41 is provided with bearings 100 which receive shaft 101 which is contiguous with screw bevel gear 102 which drives countershaft bevel gear 103 and which in turn drives upper bevel gear 104 through drive shaft 106. These in turn drive generator bevel gear 107 and through shaft 108 drives generator 109. Countershaft housing 111 is provided with O-rings to prevent leakage. Lower housing 111A similarly carries a drive shaft coupling shaft 101 to bevel gear 113 which in turn is coupled to bevel gear 114 which drives shaft 116 of generator 117. Generators 109 and 117 are mounted within and carried by generator housing 42. A polarity sensor switch 118 is disposed between generators 109 and 117 within generator housing 42. An output cable 119 provides electrical connection to controls on maintenance deck 68 (FIG. 4). The dimension span 120 (FIG. 4), the total piston excursion, is also the maximum high to low tide variation for the specific location of the generating system.

Figure 7:
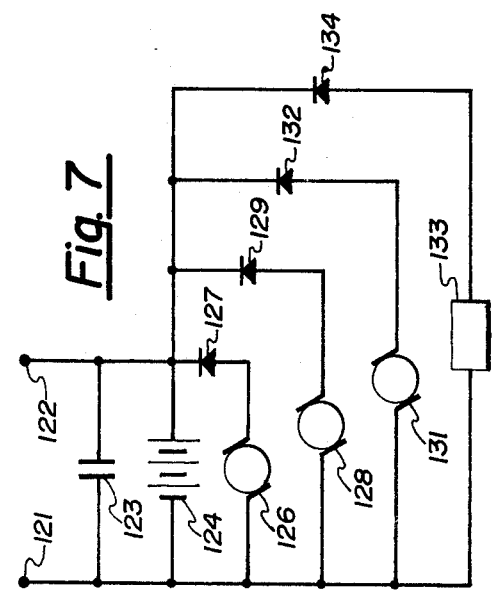
FIG. 7 is a schematic diagram of the typical electrical circuitry inter-connecting the generators of the present invention.

Referring to FIG. 7, terminals 121 and 122 are connected across capacitor 123 and battery 124 in parallel. Generator 126 and diode 127 are connected in series and across battery 124. Generator 128 and diode 129 are connected in series across battery 124. Generator 131 and diode 132 are connected in series and across battery 124. Converter 133 and diode 134 are connected in series and across battery 124.

OPERATION

Referring to FIGS. 1, 2 and 3, where the system is shown schematically, it is pointed out that the diameter of the flotation sphere is contemplated as roughly twenty feet. This, of course, is to allow for the equipment contained within the sphere and to provide inertia in the system. In FIG. 1 the shoal water case is illustrated where the drive pipe 17 is coupled directly at 21 to anchor 19. Here the flotation sphere 11 with tubular stem 18 slides up and down on drive pipe 17 according to the overall tidal depth at any given time, i.e., the position shown would indicate that the flotation sphere is at a median level. When the tide level changes to either 13 or 23, the sphere will follow the changing mean water level with a slight lag resulting in its riding up or down on drive pipe 17. Turbine 14 will at all times be above the water level in order to be energized by any ambient wind present. Fender 16 containing a plurality of screws is contiguous with the sphere and will not rise or fall with momentary ground swells which will move up and down in the area beteeen fender 16 and flotation sphere 11, and the swell screws will be rotated accordingly.

Referring specifically to FIG. 2, a relatively deep water application is shown with an additional flotation sphere 11A disposed and fixedly attached to an extended drive pipe 17A to extend the effective length and stabilize flotation sphere 11. Here flotation sphere 11A does not contain any specific equipment, but can be pressurized for added stability. This eliminates excessive slack in tether 23 since it gives flotation sphere 11 a working base that is relatively inflexible.

Referring specifically to FIG. 3, a medium shoal depth is shown where there is insufficient room for an auxiliary flotation sphere. Here, as before, sphere 11 with tubular stem 18 will be pushed up drive pipe 17 by a rising tide, but as the tide falls, some of the compressed air within the system will have to be used below the main piston 50 (FIG. 4) to raise the drive pipe 17 and tighten the tether 23A.

The major operational contents of flotation sphere 11 of FIGS. 1, 2 and 3 are displayed in the views and sections of FIG. 4. All portions of the environment are tapped as sources of energy and that energy is accumulated until demanded by a master power network (not shown) comprising a multiplicity of such units. Electrical power can be generated in four general areas: the tidal generator 66; the multiplicity of swell generators in housings 42; the upper air-driven generator 31; and the solar energy field 36 which surrounds the generator housing 12 and lies above the momentary water level 37. Interconnection of these generating elements is best shown in FIG. 7.

Power may be stored in three major ways: (1) as compressed air generated directly by, (a) piston 50 within stem 18, (b) rotary compressor 64 driven by drive pipe 17, or (c) air turbine 33 driven by wind turbine 14 or converted from electrical energy by air turbine 33 used as a compressor and driven by generator 31 recircuited as a motor; (2) as battery charge in an energy storage area such as 65; and (3) other high energy products such as hydrogen and oxygen developed from electrolysis of sea water and separately stored in gaseous forms in an energy storage area such as 76 to be piped directly into the master power network or reconverted to electrical energy by a fuel cell (not shown).

Essential to the balanced operation of the generator system are the testing and automatic control stations 67, 74, 79 and others not visible. By means of control 67: (a) electrical output of energy storage 65 or of tidal generator 66 may be routed to energy storage at 65 or 76 to the master network (not shown) or to motorized generator 31 for air compression by turbine 33 via an input port like 70 (not shown), down line 72 and through the control 67 to exit/intake port 71 where it would exhaust into sphere 11, (b) external air can be brought from port 70, down line 69, through control 67, down to tidal compressor 64, where it is compressed, sent up to control 67, and diverted through port 71 to the interior of sphere 11 or routed through line 72 to air turbine 33 to drive generator 31, or (c) internal air within sphere 11 can enter control 67 and be routed through line 72 to turbine 33 for generation of electrical power by generator 31.

By means of control 74, external air may be received through line 77 through a port (not shown) like 70, introduced through manifold 73 into half of hose 58 for communicating with internal chamber 93 (FIG. 5) of drive pipe 17, and thence through internal ports 47 above piston 50 to fill the vacuum which would otherwise be created when the piston 50 traveled downward as a rising tide lifts flotation sphere 11 along drive pipe 17. Control 74 also receives air from the chamber below the piston 50 through external ports 48 and up the external chamber 94 of drive pipe 17 through half of hose 58 and manifold 73 where it can be exhausted through port 78 to the interior of sphere 11. In opposite manner, by the same exact route, internal compressed air in sphere 11 may be introduced below piston 50 to keep the tether of FIG. 3 taut as the tide recedes.

Referring to FIG. 7, a typical electrical schematic diagram is shown in which generators 126, 128 and 131 are coupled through isolation rectifying diodes 127, 129 and 132, respectively, each being in parallel across storage capacitor 123 and storage battery 124. Converter 133 would indicate a heat exchange converter which would be coupled to solar energy absorbing surfaces 36 on flotation sphere 11. This would be analogous to the generators. Hence, the generator can be generators or alternators with suitable rectifiers and isolation diodes or, in the alternative, they could all be D.C. generators with their own separate storage batteries and/or storage capacitors. The output here is indicated at 121 and 122. Since this is merely exemplary and extremely simplified, details such as the polarity sensing switches, etc., are not included.

It should be understood, of course, that the foregoing disclosure relates to only a preferred embodiment of the present invention, and that it is intended to cover all changes and modifications of the example of the invention herein chosen, for the purposes of the disclosure, which do not constitute departures from the spirit and scope of the invention.

The invention claimed is:

1. An electrical generating system disposed in tidal waters comprising:

a hermetically sealed flotation sphere having a predetermined buoyancy for exposing an upper portion of the sphere's surface area above the water line of an aqueous medium in which it is disposed;

a drive pipe slidably received by said flotation sphere, said drive pipe being coupled to an anchor means at the bottom of said aqueous medium;

a plurality of drive screw assemblies vertically disposed around the periphery of said flotation sphere beneath said water line, said drive screw assemblies being substantially tangential to said flotation sphere; and first electrical generating means carried within said flotation sphere and coupled to said drive screws.

2. The electrical generating system of claim 1 and further including:

second electrical generating means disposed within said flotation sphere and directly coupled to said drive pipe, said first and second generating means being coupled to a common storage means.

3. The electrical generating system of claim 1 and further including:

air compression means directly coupled to said drive pipe, said air compression means operable for pressurizing said flotation sphere.

4. The electrical generating system of claim 1 and further including:

a wind turbine rotatably carried by said flotation sphere at the top outside portion thereof and a second electrical generating means disposed within said flotation sphere and coupled to said wind turbine, said first and second generating means having outputs coupled to a common storage means.

5. The electrical generating system of claim 1 and further including:

a second flotation sphere disposed beneath said first mentioned flotation sphere, said second flotation sphere being coupled between said drive pipe and said anchor means.

6. The electrical generating system of claim 1 and further including:

a solar generating means disposed on the upper exposed surface of said flotation sphere, said solar generating means coupled to a heat exchange convertor operable for converting solar heat to electrical energy, said convertor and said first generating means having outputs coupled to a common storage means.

* * * * *